US010214130B2

(12) United States Patent
DeLeon (10) Patent No.: US 10,214,130 B2
(45) Date of Patent: Feb. 26, 2019

(54) COLLAPSIBLE ORGANIZER FOR IN-VEHICLE STORAGE (71) Applicant: John DeLeon, San Diego, CA (US)

(72) Inventor: John DeLeon, San Diego, CA (US)

(*) Notice: Subject to any disclaimer, the term of this patent is extended or adjusted under 35 U.S.C. 154(b) by 0 days.

(21) Appl. No.: 14/868,286

(22) Filed: Sep. 28, 2015

(65) Prior Publication Data
US 2017/0088030 A1 Mar. 30, 2017

(51) Int. Cl.
B60N 3/10 (2006.01)
B65D 6/18 (2006.01)
B65D 25/32 (2006.01)

(52) U.S. Cl.
CPC ............. *B60N 3/103* (2013.01); *B60N 3/102* (2013.01); *B65D 11/1833* (2013.01); *B65D 25/32* (2013.01)

(58) Field of Classification Search
CPC .............. B60N 3/004; B60R 7/043; B60R 2011/0012–2011/0017; B60R 2011/0276
USPC .......................... 224/275, 484, 485
See application file for complete search history.

(56) References Cited

U.S. PATENT DOCUMENTS

| 1,179,445 A * | 4/1916 | Manning ................. B60R 7/043 224/275 |
| 1,488,418 A * | 3/1924 | Walther .................... B65D 7/16 220/7 |
| 2,903,311 A * | 9/1959 | Earhart .................... A47G 23/06 108/34 |
| 3,326,445 A | 6/1967 | Goings |
| 4,832,241 A * | 5/1989 | Radcliffe ................ B60R 7/043 108/44 |
| 4,938,401 A | 7/1990 | Weisbrodt et al. |
| 5,490,623 A * | 2/1996 | McConnell ............. B60R 7/043 206/233 |
| D368,889 S | 4/1996 | Mankey et al. |
| 5,947,542 A * | 9/1999 | Lux ..................... B60N 2/01583 296/65.03 |
| 6,056,177 A * | 5/2000 | Schneider ................. B60R 5/04 220/4.28 |
| 6,276,582 B1 * | 8/2001 | Alexander .............. B60R 7/043 217/16 |
| 6,789,711 B2 * | 9/2004 | Kinsella .................... B60R 7/02 220/7 |
| 7,300,088 B1 | 11/2007 | Catenacci et al. |

(Continued)

Primary Examiner — Brian D Nash
(74) Attorney, Agent, or Firm — Steins & Associates, P.C.

(57) ABSTRACT

A Collapsible Organizer for in-Vehicle Storage. The organizer provides the driver with a large, stable container for food, drinks and other items. The organizer is attachable to a seat in a vehicle either by hanging from the seat back, or alternatively, by engaging the existing seat belts. The organizer is comprised of a set of movable panels and elements that allow the organizer to be collapsed into a very compact package. The organizer is also easily expandable when desired for use, without the need for tools. The organizer has built-in handles to allow the user to easily remove the organizer from a vehicle and then carry the organizer while the drinks or other items are being held in the organizer. In addition to its ability to safely hold food and drinks, the organizer provides a generous storage area that can be used to store childrens' toys, personal carry items, and portable electronic devices. Finally, the organizer is lightweight, durable, and preferably be made primarily from plastic.

14 Claims, 13 Drawing Sheets

(56) References Cited

U.S. PATENT DOCUMENTS

| | | | | |
|---|---|---|---|---|
| 7,429,078 B1* | 9/2008 | Tarlow | ............... | B60R 7/043 224/275 |
| 2001/0020631 A1* | 9/2001 | Spykerman | ............... | B60R 7/02 224/539 |
| 2006/0243766 A1* | 11/2006 | Lan | ............... | A45C 11/00 224/275 |
| 2007/0228097 A1* | 10/2007 | Recanati | ............... | A45C 13/02 224/580 |
| 2008/0128460 A1* | 6/2008 | Adler | ............... | B60N 2/4876 224/275 |
| 2008/0142558 A1* | 6/2008 | Dexter | ............... | B60R 7/02 224/275 |
| 2011/0121046 A1* | 5/2011 | Dexter | ............... | B60R 7/02 224/581 |

* cited by examiner

COLLAPSIBLE ORGANIZER FOR IN-VEHICLE STORAGE

This application is filed within one year of, and claims priority to Provisional Application Ser. No. 62/072,897, filed Oct. 30, 2014.

BACKGROUND OF THE INVENTION

1. Field of the Invention

This invention relates generally to vehicle accessories and, more specifically, to a Collapsible Organizer for in-Vehicle Storage.

2. Description of Related Art

Most fast food restaurants offer drive-through service. If the driver is only purchasing a single meal, this can be a very convenient way to have a meal when a sit-down meal is not possible. Problems arise, however, when the driver is purchasing meals for several people. In that case, the driver must determine a way to safely restrain multiple drinks and food containers within a moving car. The seats are not level, there's no easy way to strap things down, and furthermore, there is no easy way to tote the meals out of the car and into the house upon arrival. A number of prior inventors have attempted to address this issue.

Mankey, U.S. Pat. No. D368,889 for "Car Caddy" depicts the design for a non-collapsible storage accessory for vehicles that is fairly small in size and limited in its capacity.

Catenacci, U.S. Pat. No. 7,300,088 for "Collapsible Vehicle Storage Container" discloses a collapsible box for attaching to the flat area underneath a seat bottom. While it does collapse, it does not provide convenient and handy storage for food and beverages that is attachable to a vehicle passenger seat.

Weisbrodt, U.S. Pat. No. 4,938,401 is a device that attaches to the passenger seat, but only provides very limited storage capacity, and is not collapsible.

Goings, U.S. Pat. No. 3,326,445 describes a "Car Seat Tray" that creates a level surface on a seat bottom, and upon which drinks and other items can be held. The Goings device is also very limited in its storage capacity, and is not collapsible.

What is needed, then, is a storage container for attaching to, or resting upon, a vehicle seat that has substantial storage capacity, and is further collapsible so that it can be stored underneath the vehicle seat when not in use.

SUMMARY OF THE INVENTION

In light of the aforementioned problems associated with the prior devices, it is an object of the present invention to provide a Collapsible Organizer for in-Vehicle Storage. The organizer should provide the driver with a large, stable container for food, drinks and other items. The organizer should be attachable to a seat in a vehicle either by hanging from the seat back, or alternatively, by engaging the existing seat belts. The organizer should be comprised of a set of movable panels and elements that allows the organizer to be collapsed into a very compact package. The organizer should be easily expandable when desired for use, without the need for tools. The organizer should be lightweight, durable, and preferably be made primarily from plastic.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Collapsible Organizer for in-Vehicle Storage.

Figure 1:
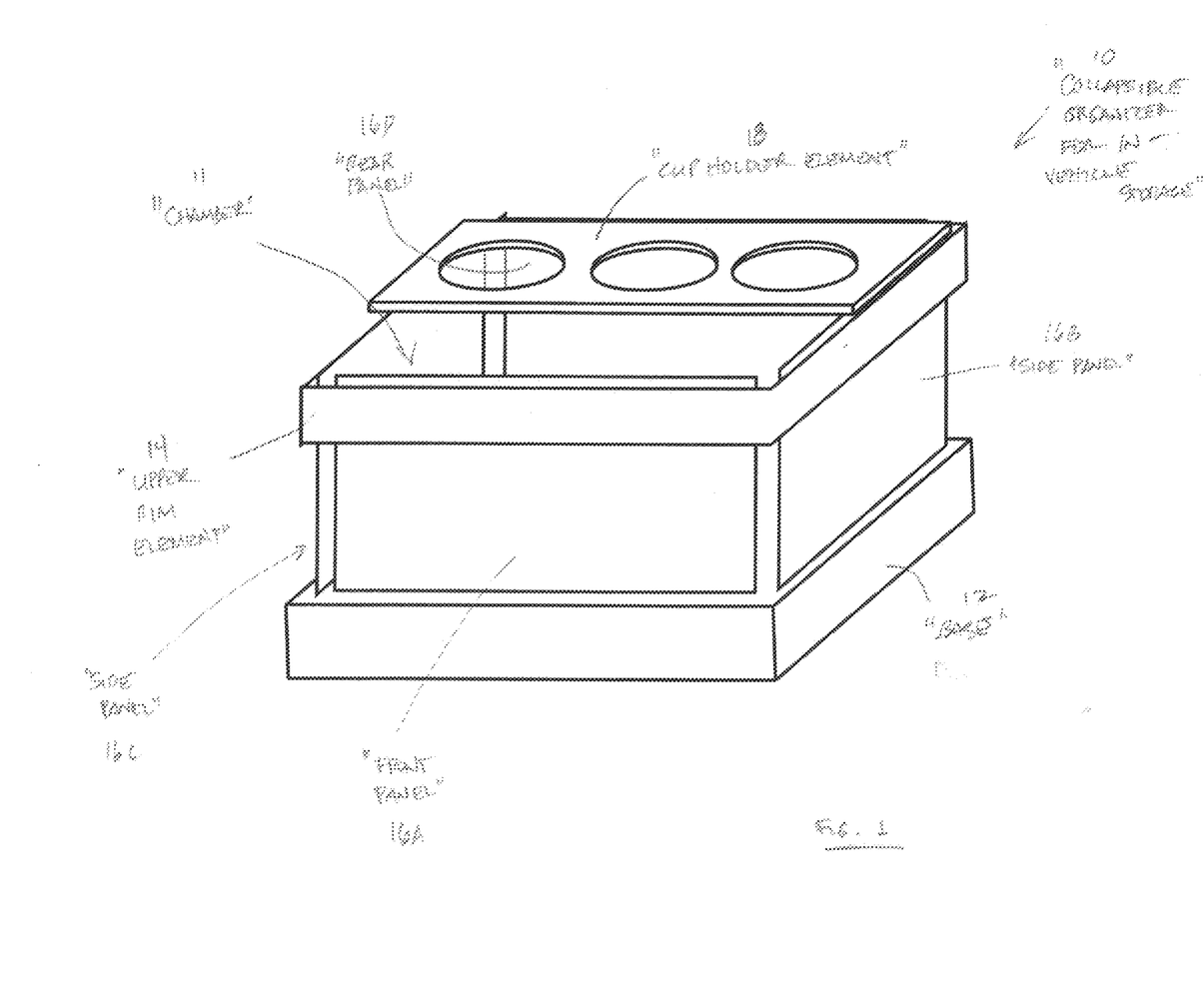
FIG. 1 is a perspective view of a preferred embodiment of the Collapsible Organizer of the present invention.

The present invention can best be understood by initial consideration of FIG. 1.[1] FIG. 1 is a perspective view of a preferred embodiment of the Collapsible Organizer 10 of the present invention. This depiction is conceptual in nature and is only provided to give the reader a general idea of the arrangement of major components of the device 10; further detail is provided below in connection with other drawing figures.

[1] As used throughout this disclosure, element numbers enclosed in square brackets [ ] indicates that the referenced element is not shown in the instant drawing figure, but rather is displayed elsewhere in another drawing figure.

The great value of the organizer 10 is that it provides a large chamber 11 in addition to be able to hold several large drink cups. These features are provided even though the device 10 can be collapsed so that it can be slid underneath most automobile seats (or otherwise stored in a small space).

The organizer 10 is preferably formed from individual molded plastic pieces that are assembled to form the final structure. The base 12 is molded in a single piece. Front panel 16A, side panels 16B and 16C and rear panel 16D extend upwardly from the base 12. As will be discussed further below, the panels 16A-16D are pivotally attached to the base 12, so that they can fold down for storage. This pivotal functionality could be accomplished by a variety of known (and potentially heretofor unknown) pivotal connections, including (but not limited to) hinges, straps and the like.

Figure 2:
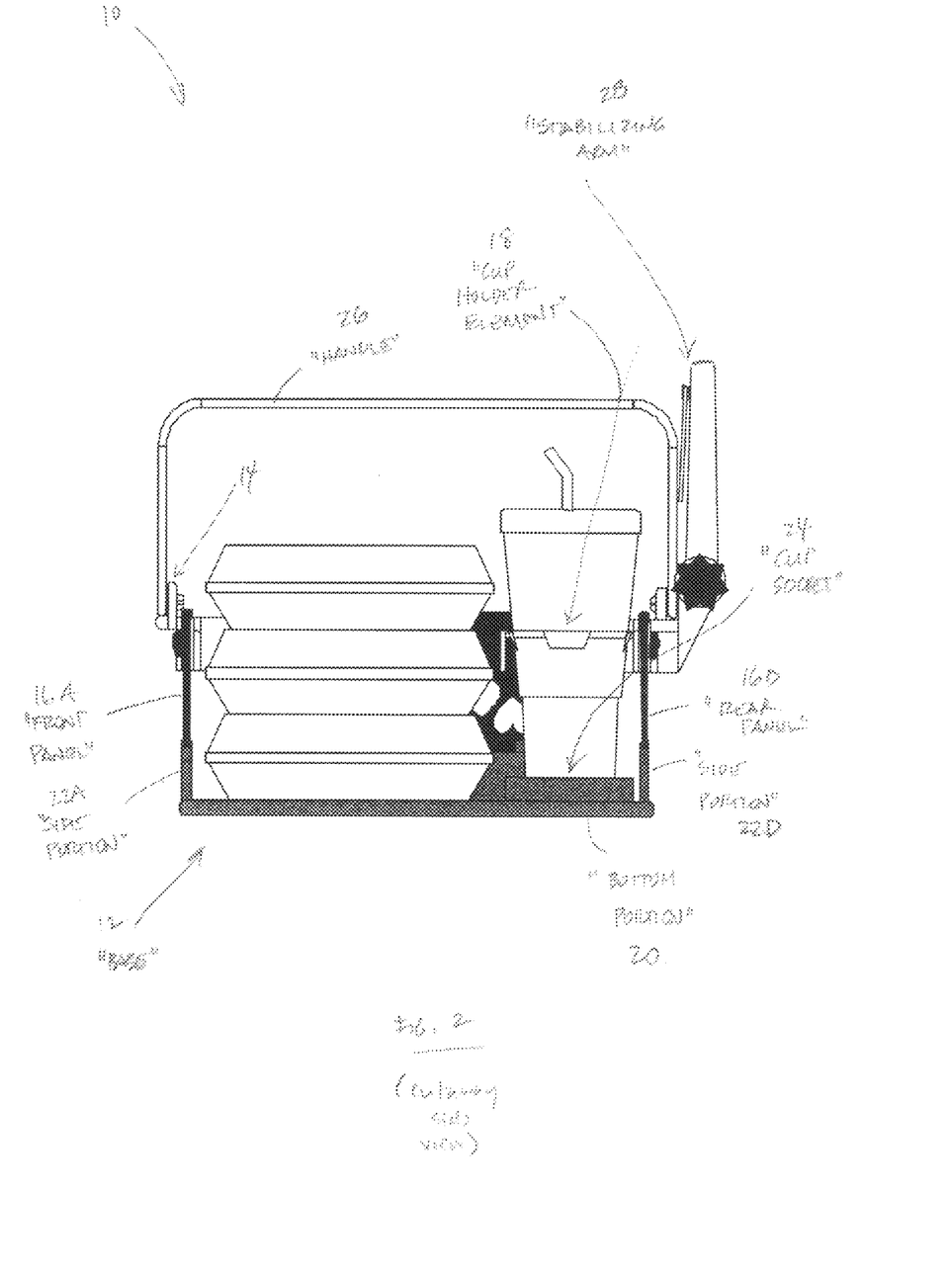
FIG. 2 is a cutaway side view of the organizer of FIG. 1.

An upper rim element 14 stabilizes the top edges of the four panels 16A-16D, and also provides a mounting location for other elements in the organizer 10, such as the cup holder element 18. FIG. 2 provides additional detail regarding this novel design.

FIG. 2 is a cutaway side view of the organizer 10 of FIG. 1. The base 12 is shown here to comprise a bottom portion 20 and two side portions 22A, 22D (the other two side portions are not shown). A of spill trough 24 (aligned with the apertures in the cup holder element 18) is formed in the bottom portion 20 of the base 12. The front and rear panels 16A and 16D extend upwardly from the side portions 22A, 22D (likewise for the non-depicted side panels [16B, 16C] and side portions [22B, 22C]).

Figure 3:
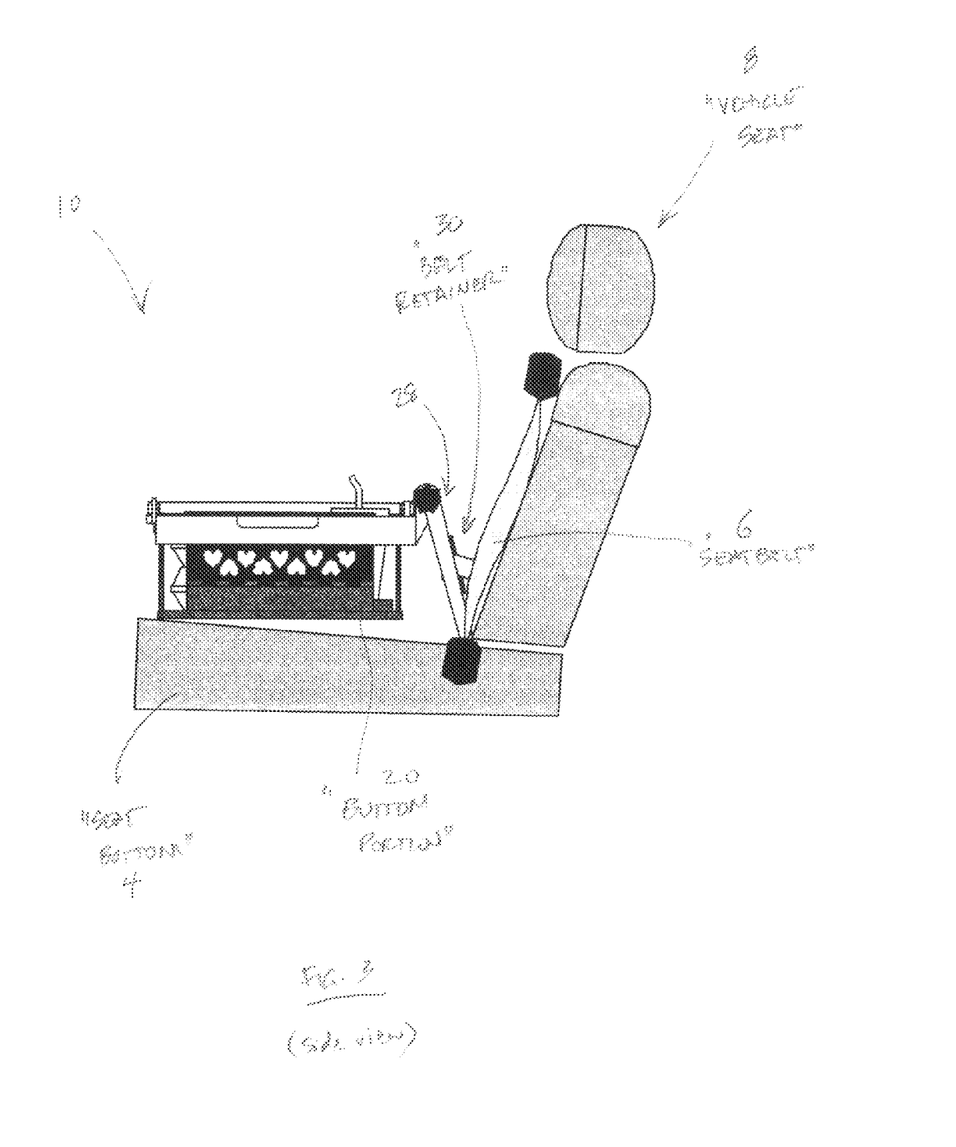
FIG. 3 is a side view of the organizer of FIGS. 1 and 2 attached to a conventional car seat.

Handle 26 is pivotally attached to the upper rim element 14. The handle 26 can be flipped up (as shown) so that the user can carry their items conveniently to and from the vehicle. Stabilizing arm 28 is also pivotally attached to the upper rim element 14. The stabilizing arm is interchangeable with a headrest arm [32], depending upon whether the user prefers to attach the organizer 10 to the seat with a seatbelt, or by handing from the headrest. In FIG. 3, we can see the operation of the stabilizing arm 28.

Figure 4:
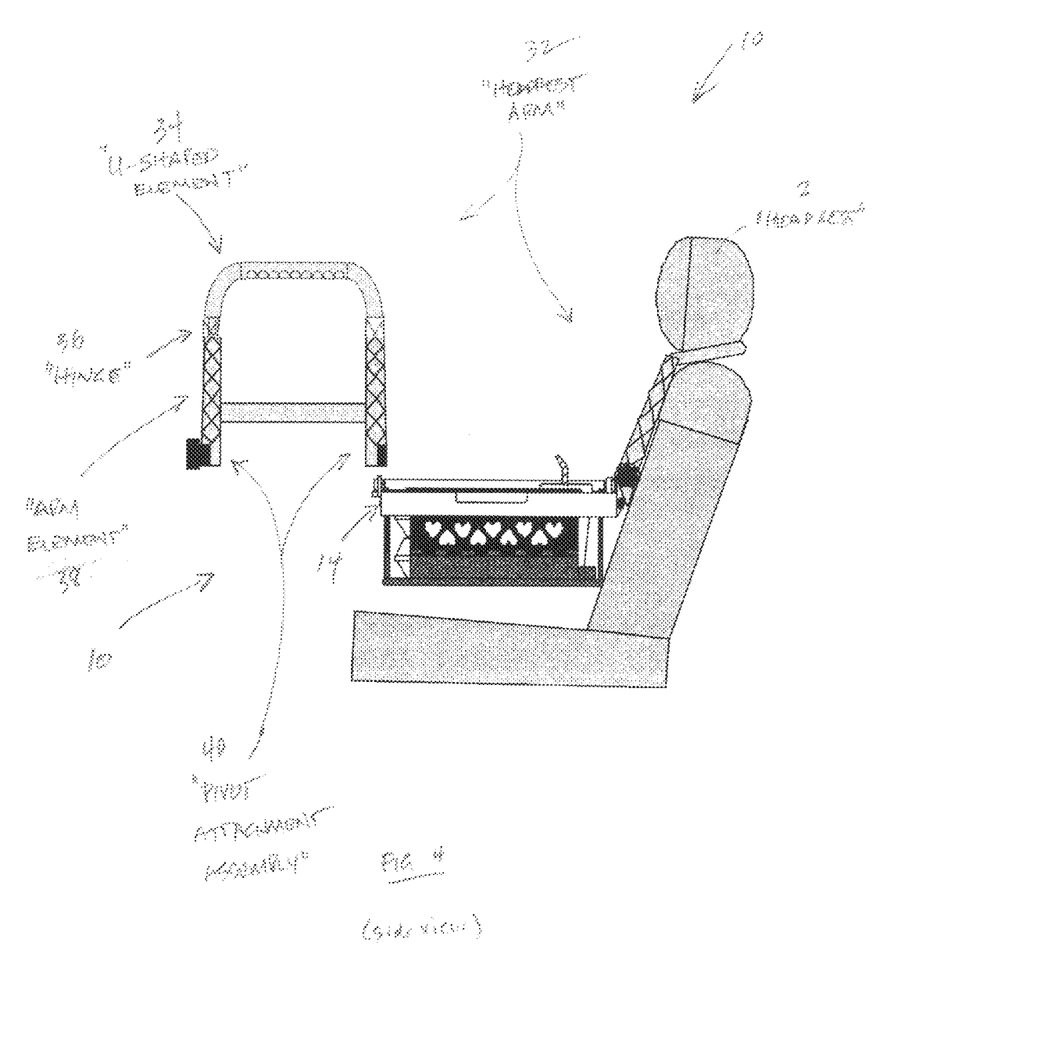
FIG. 4 is a partially exploded side view of the organizer of FIGS. 1-3.

FIG. 3 is a side view of the organizer 10 of FIGS. 1 and 2 attached to a conventional car seat 8. As shown here, the seat bottom 4 is not level. In most cases, this would result in dumping of food, or spillage of drinks placed in the organizer 10. Here, the stabilizing arm 28 can be rotated down (clockwise in this view) so that is braces against the seat 8, such that the bottom portion 20 is held level. The stabilizing arm 28 also has an integrated belt retainer or belt "catch" 30. The belt retainer is molded into or within the stabilizing arm 28 so that the user can thread the seatbelt 6 (usually the lap belt) therethrough. This will hold the organizer 10 securely to the seat 8, while the stabilizing arm 28 maintains the organizer 10 in a level position. FIG. 4 depicts an alternate arrangement for attaching the organizer 10.

FIG. 4 is a partially exploded side view of the organizer 10 of FIGS. 1-3. In this configuration, the stabilizing arm [28] has been replaced with the headrest arm 32. As can be imagined, the headrest arm 32 is designed to hang from the vehicle seat's headrest 2. It does this by looping the U-shaped element 34 at the top of the headrest arm 32 over the headrest 2. The U-shaped element 34 is pivotally attached to an arm element 36 by hinges 36 that allow the U-shaped element 34 to adjust for the angle of the top of the seat. The pivot attachment assemblies 40 attach the arm element 38 to the upper rim element 14, and also allows it to be rotated into the desired angular position and then cinched or locked in place. In this embodiment, a rod and knob arrangement has been used. If we now turn to FIGS. 5A-9B, we can examine the steps to convert the organizer 10 from a collapsed state to a fully assembled/expanded state.

Figure 5A:
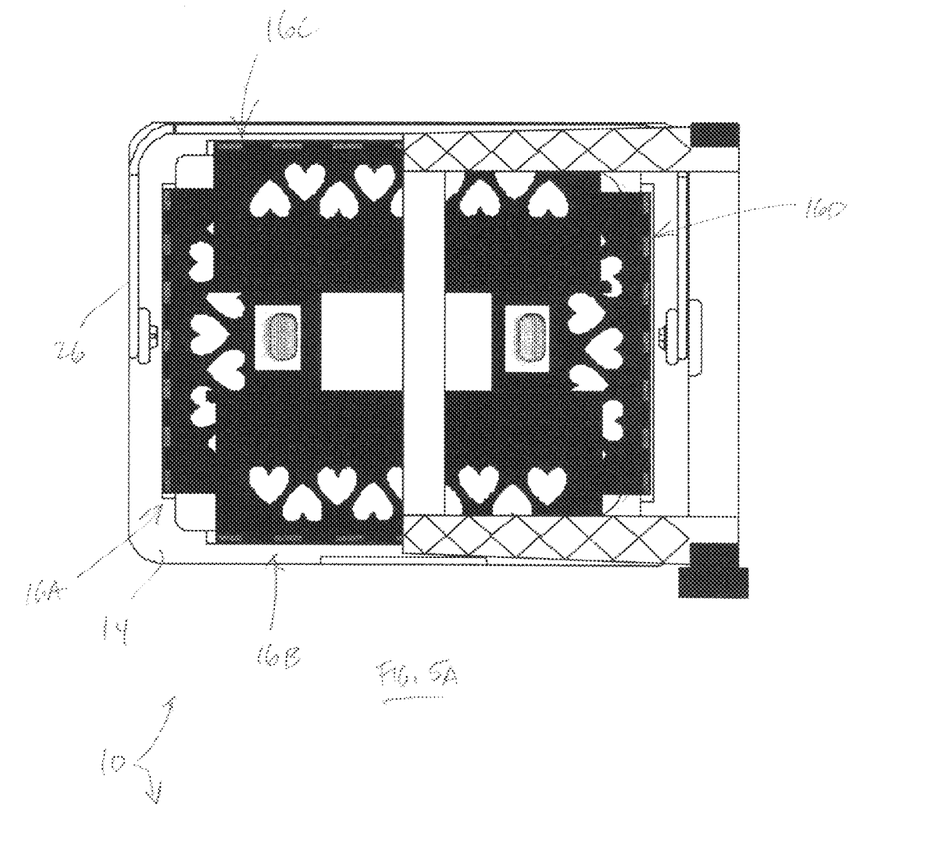
FIGS. 5A and 5B are top and side views, respectively, of the organizer of FIGS. 1-4 in a collapsed position.
Figure 5B:
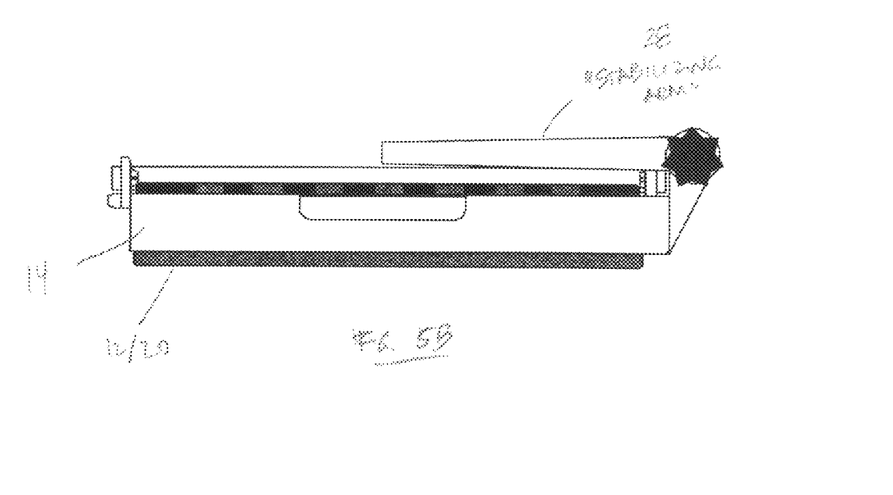

FIGS. 5A and 5B are top and side views, respectively, of the organizer 10 of FIGS. 1-4 in a collapsed position. Here, the side panels 16A, 16B, 16C and 16D are folded flat atop the base 12 by operation of the pivotal attachments between the side panels 16A, 16B, 16C and 16D and the base 12. This ability to flatten the organizer 10 (by operation of the foldable side panels) has not been seen in prior devices, and is considered to be a primary functional benefit of the organizer 10.

The upper rim element 14 has been slid down so that is encircles the base 12. The arm 28 and handle 26 have also been folded flat. In this position, the organizer can be stored in very small spaces.

Figure 6A:
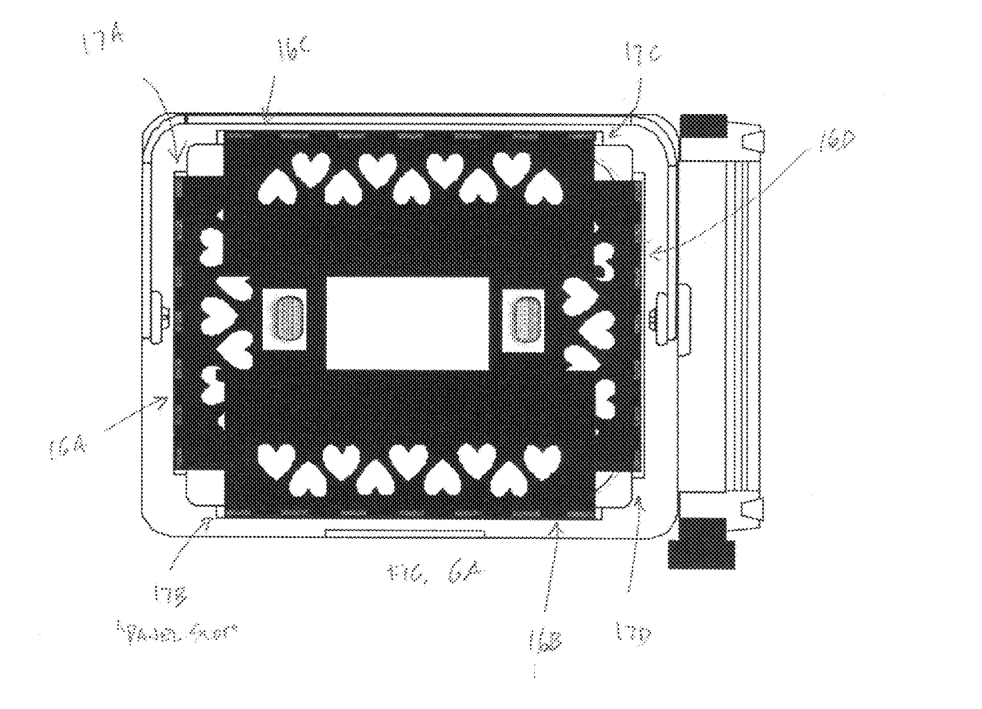
FIGS. 6A and 6B are top and side views, respectively, of the organizer of FIGS. 1-5A/5B in a first stage of expansion position.
Figure 6B:
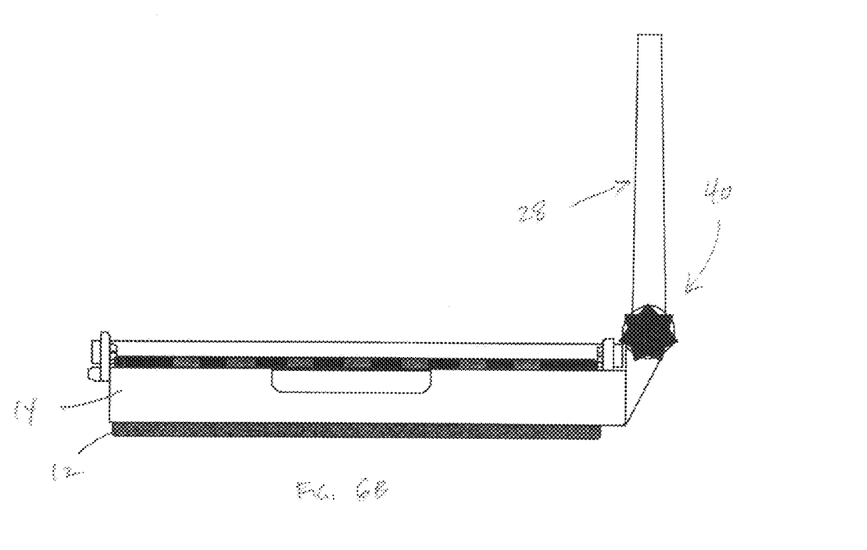
Figure 9A:
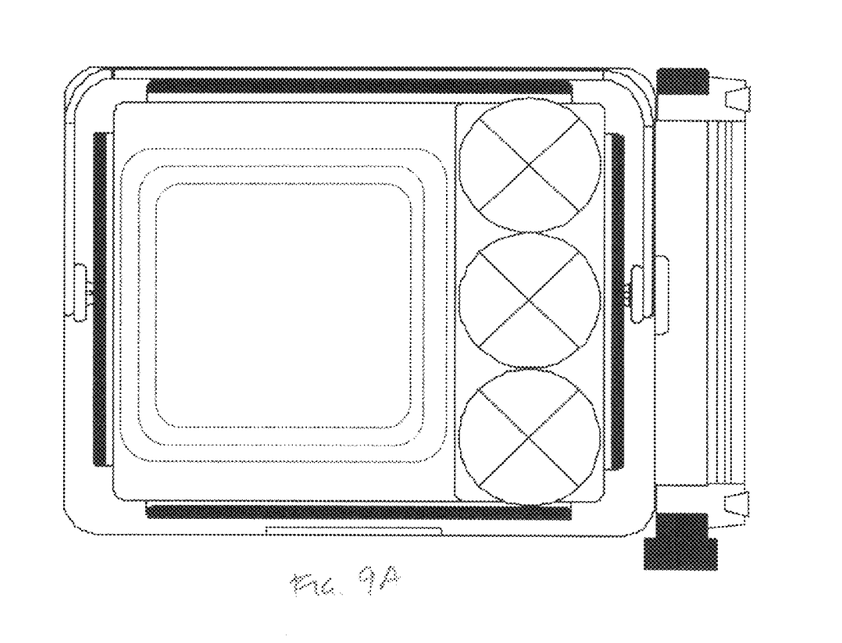
FIGS. 9A and 9B are top and side views, respectively, of the organizer of FIGS. 1-8A/8B in a fully expanded position.
Figure 9B:
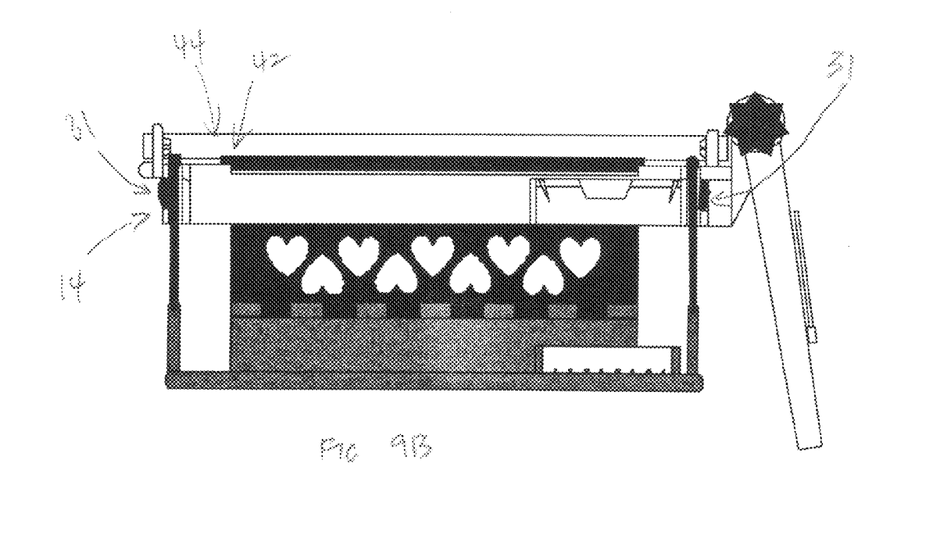

FIGS. 6A and 6B are top and side views, respectively, of the organizer 10 of FIGS. 1-5A/5B in a first stage of expansion position. To commence expansion, the arm 28 must first be rotated (counter-clockwise in this view). The arm 28 is released by first loosening the pivot attachment assembly 40. There are panel slots 17A, 17B, 17C and 17D formed around the periphery of the upper rim element 14. Each side panel (e.g. [16A]) is captured within the corresponding panel slot (e.g. 17A). These slots 17A-17D serve at least three functions: first, when the organizer 10 is in its collapsed condition as shown here, the side panels 16A-16D (which are attached by hinges to the base 12) will restrain the upper rim element 14 from travelling up. This will keep the organizer in a nicely compact condition. Secondly, as the upper rim element 14 is lifted up by the user (shown sequentially in subsequent Figures), the upper rim element will impart upward (unfolding) force on all of the side elements 16A-16D. This will cause the side elements 16A-16D to flip up (i.e. rotating around their hinged attachment to the base 12. Finally, when the organizer 10 is fully expanded (as shown in FIGS. 9A and 9B), the slots 17A-17D will hold the side panels 16A-16D in their erect (vertical) positions. It should be understood that the stages of expansion described below are merely for the purpose of understanding how the different elements interact. In fact, as the upper rim element 14 is pulled up, all four side panels 16A-16D will be forced to become erect. Because the slots 17A and 17D are slightly recessed below the level of slots 17B and 17C, panels 16B and 16C will be forced upwardly slightly before panels 16A and 16D (and the panels 16A-16D will fold flat in the opposite order).

Figures 7A, 7B:
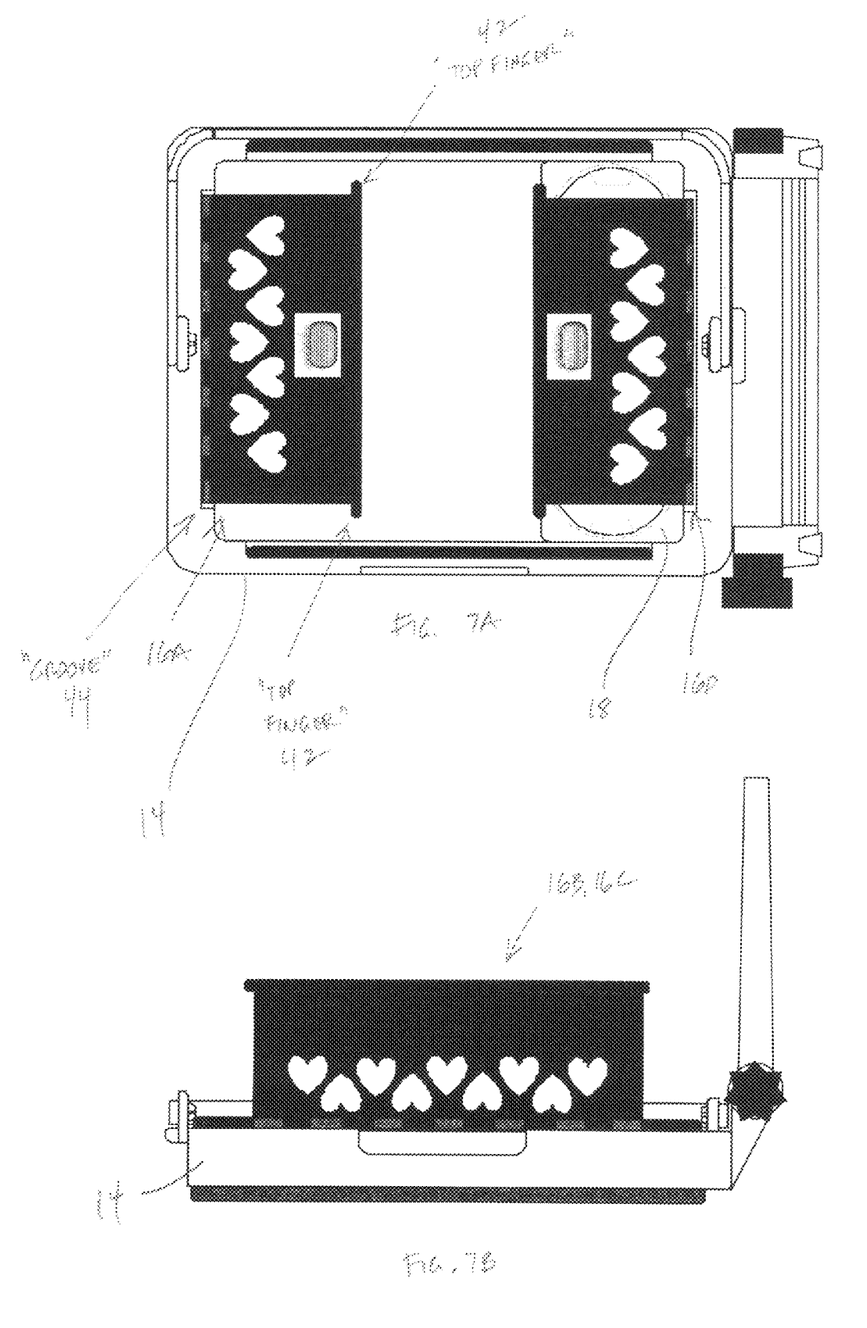
FIGS. 7A and 7B are top and side views, respectively, of the organizer of FIGS. 1-6A/6B in a second stage of expansion position.

FIGS. 7A and 7B are top and side views, respectively, of the organizer 10 of FIGS. 1-6A/6B in a second stage of expansion position. The side panels 16B, 16C are flipped up around the hinged attachment to the side portions (not shown) until they are vertical. The user can achieve this stage of expansion by holding the upper rim element 14 and sliding it upwardly (increasing the distance between the base 12 and the element 14). As the upper rim element 14 is raised, the element 14 will force the side panels 16B and 16C to flip up.

As shown in FIG. 7A, there are grooves 44 formed in the top surface of the upper rim element 14, that correspond to the fingers 42 extending from the ends of the top edge of each side panel 16A-16D. The fingers 42 will be held within the grooves 44 when the side panels 16A-16D are fully erected and the upper rim portion 14 is slid to its upper position.

Figure 8A:
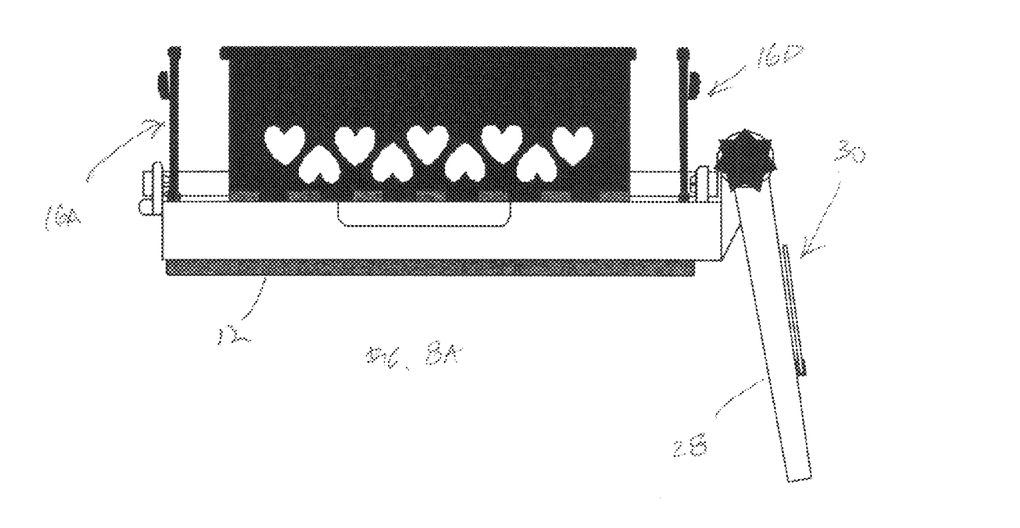
FIGS. 8A and 8B are top and side views, respectively, of the organizer of FIGS. 1-7A/7B in a concurrent second stage of expansion position.
Figure 8B:
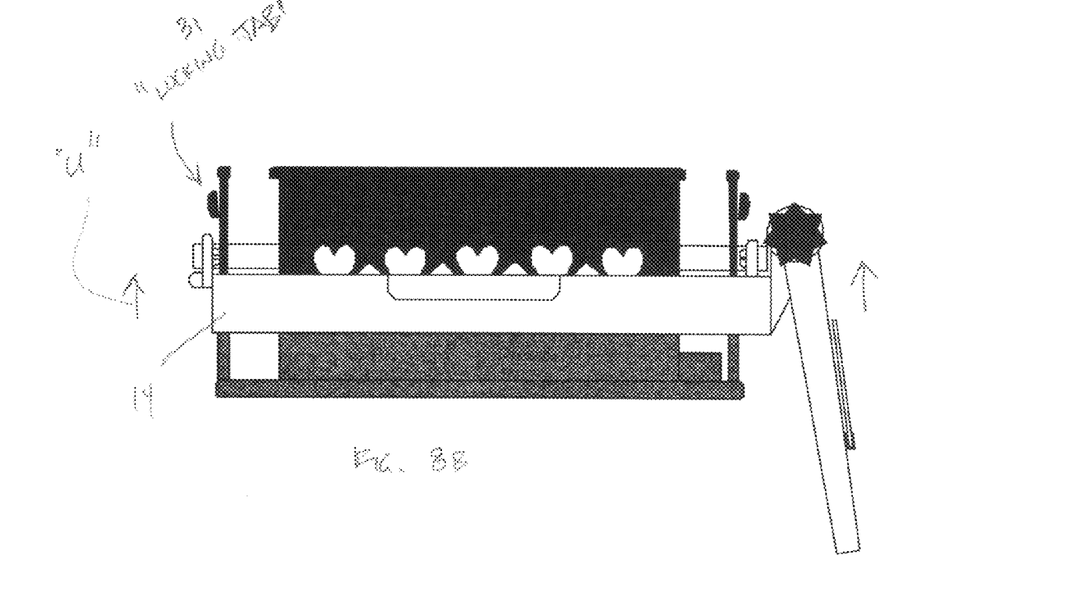

FIGS. 8A and 8B are top and side views, respectively, of the organizer 10 of FIGS. 1-7A/7B in a concurrent second stage of expansion position. Here, the stabilizer arm 28 has been rotated down into its desired position to level the base 12 (although the arm 28 does not have to be placed in this position in order to complete the expansion of the organizer 10). The front and back side panels 16A and 16D have been flipped up into their vertical position, and the upper rim element 14 has begun being slid upwardly in direction "U." Each side panel 16A-16D has a locking tab 31 extending outwardly from it. These tabs 31 will lock the upper rim element 14 in its upper position once the organizer has been fully expanded.

FIGS. 9A and 9B are top and side views, respectively, of the organizer 10 of FIGS. 1-8A/8B in a fully expanded position. As shown here, the fingers 42 reside in the grooves 44, which prevents the side panels 16A-16D from folding down, or from permitting the upper rim element 14 from being overextended in its travel past the tops of the panels 16A-16D. The tabs 31 have popped out and are locking the upper rim element 14 in place at the top of its travel, thereby stabilizing the entire structure.

Figure 10:
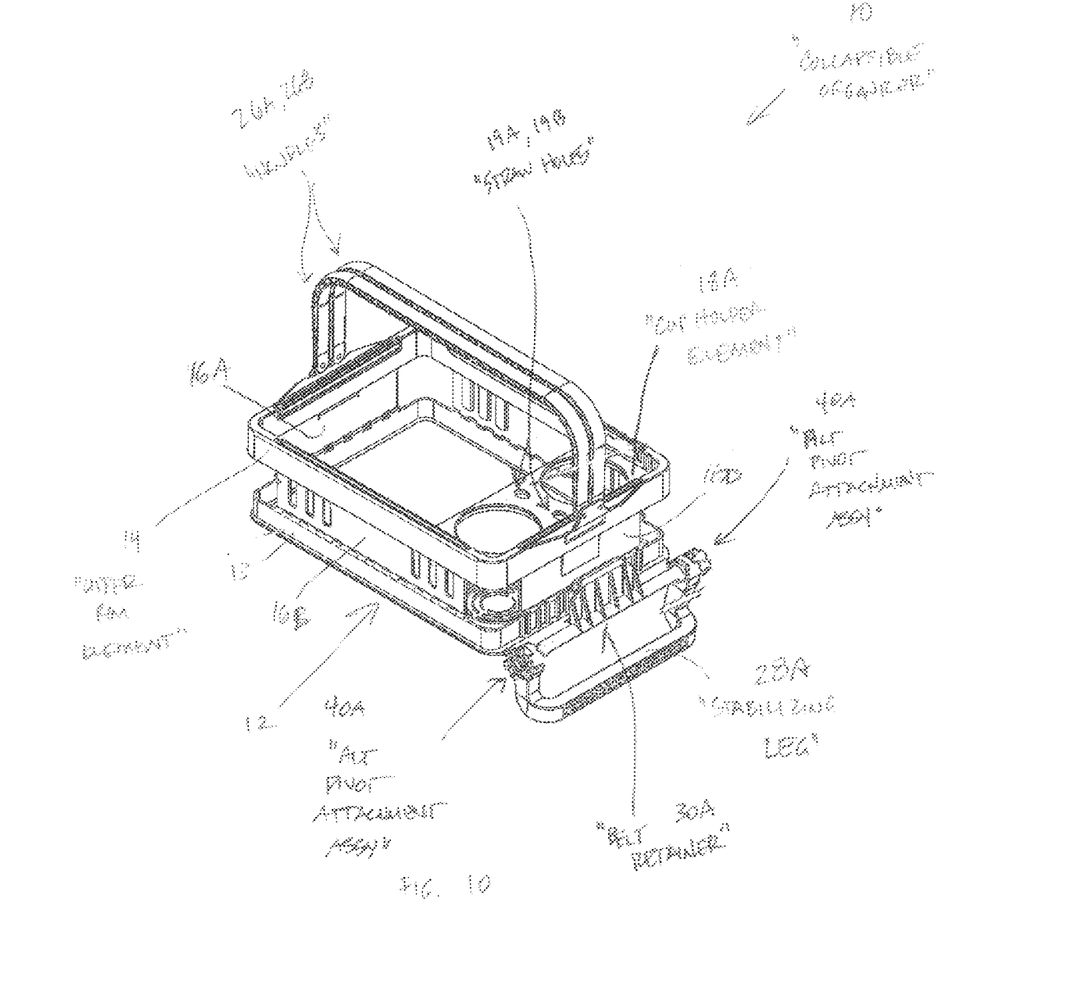
FIG. 10 is a perspective view of a second embodiment of the collapsible organizer of the present invention.

FIG. 10 is a perspective view of a second embodiment of the collapsible organizer 10 of the present invention. The depicted design is essentially the same as that previously-described, with some fine tuning to certain elements in the structure.

The base 12 in this version has a upright sidewall 13 surrounding the central flat portion of the base 12. The sidewall 13 is provided for a number of reasons: to add strength and stiffness to the base 12; to create a "berm" or "trough" to capture liquids or solid objects to prevent them from falling off of the base 12; and finally, to assist in aligning the base 12 with the upper rim element 14 when the organizer is collapsed into a flattened state (i.e. the sidewall 13 fits into the upper rim element 14.

The cup holder element 18A shown here, only has a pair of apertures to hold drink cups (in contrast to the three apertures shown in the prior-discussed version). Furthermore, a pair of straw holes 19A, 19B have been provided so that the user can store his or her drinking straws next to their drink in the organizer 10. The straw holes 19A, 19B are non-circular in shape (i.e. oval-shaped) so that straws of a variety of diameters can be placed into the holes 19A, 19B, and thereafter held fairly securely.

The stabilizing arm [28] that was attached to the upper rim element 14 has been replaced with a stabilizing leg 28A, which has virtually the same purpose—to compensate with the inclination/shape of the car seat so that the base 12 can be held level in the vehicle (so that drinks do not spill). In order to improve the ease of adjustability, there are a pair of pivot attachment assemblies 40A, 40B, rather than just one single one [40]. As should be apparent, the leg 28A can be pivotally adjusted so that it extends downward (until it rests on the car seat surface and props the base 12 up on its end to keep the organizer 10 level).

Finally (for this view), the belt retainer 30A has been relocated to the base 12 in order to simplify the structure of the organizer 10. It, like the prior-described belt retainer [30] is provided so that the user can run the seatbelt through it to secure the organizer 10 to the car seat.

Figure 11:
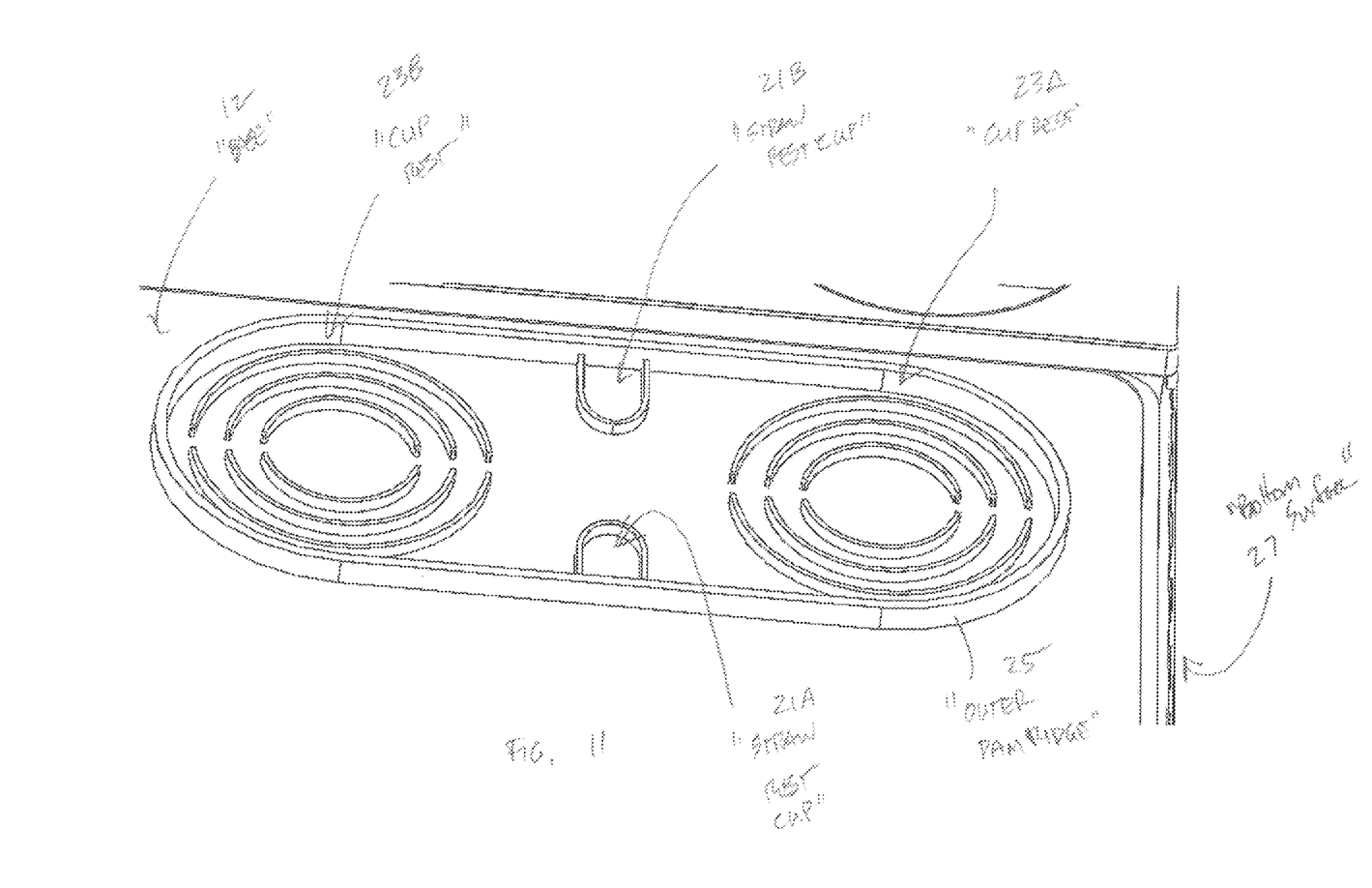
FIG. 11 is a partial perspective view of the upper surface of the base of the organizer of FIG. 10.

FIG. 11 is a partial perspective view of the upper surface of the base 12 of the organizer of FIG. 10. Juxtaposed beneath the cup holder element [18A], on the upper surface of the base 12, is a series of ridges to assist in holding any drink cups or straws placed into the organizer 10. There are a pair of circular cup rests 23A, 23B, which provide a non-slip surface for the base of the drink cup. There are also a pair of straw rest cups 21A, 21B into which the user inserts the lower end of the straws. This will maintain the straws in an upright condition in the organizer 10. The outer dam ridge 25 is intended to contain any liquid from the drink cups (e.g. from spillage or condensation) from leaking out onto the rest of the upper surface of the base 12. The bottom surface 27 of the base 12 has a texture embossed or attached to it. This texture aids in preventing the organizer from sliding around on the vehicle seat while the user is driving.

Figure 12:
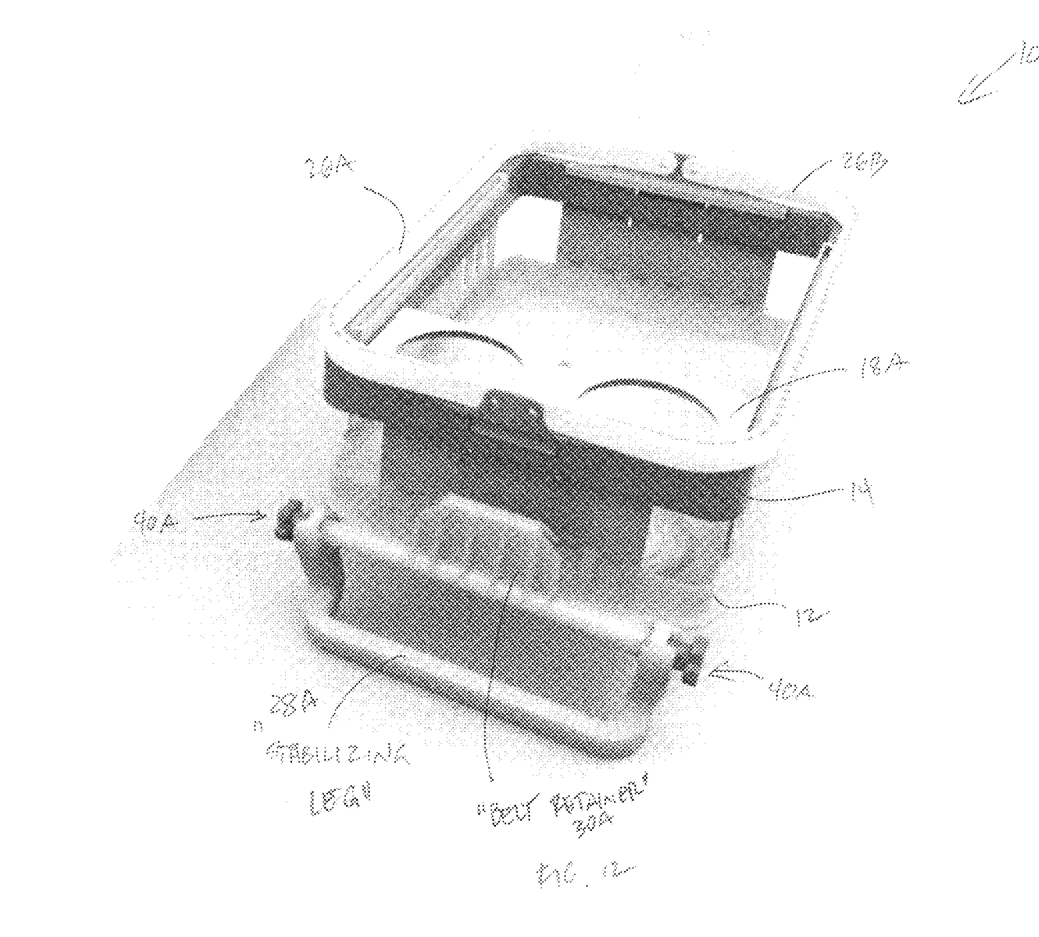
FIG. 12 is another perspective view of the organizer of FIG. 10.
Figure 13:
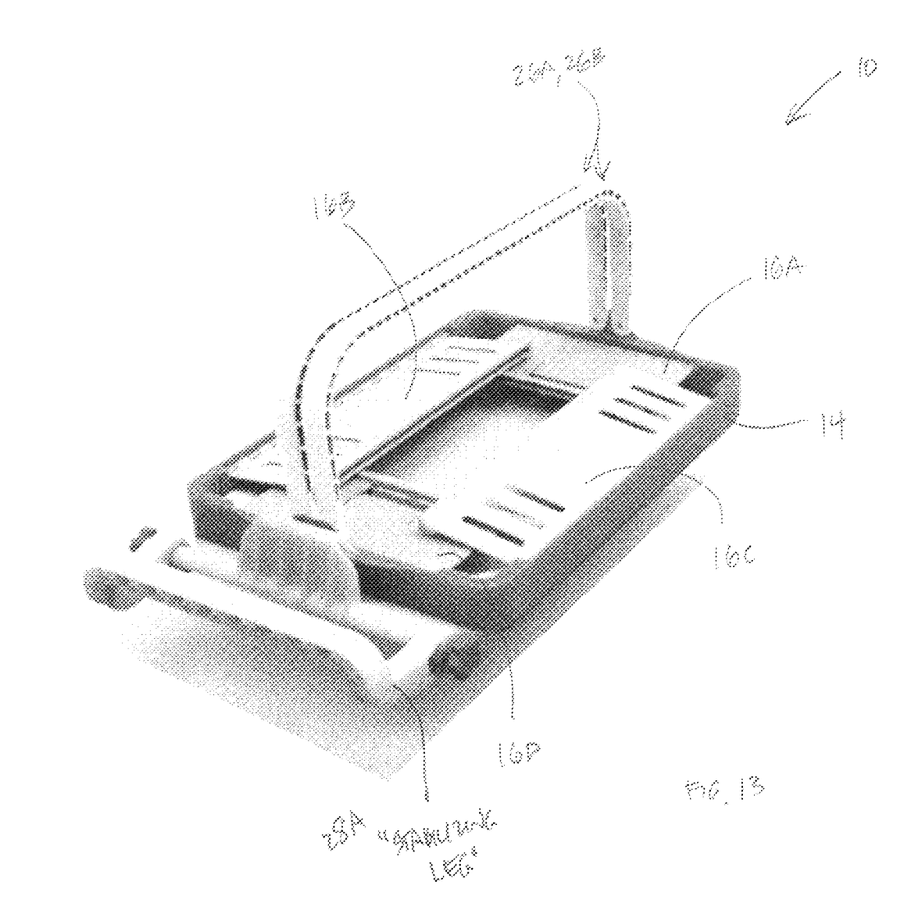
FIG. 13 is a perspective view of the organizer of FIG. 13 in a partially-flattened state.

FIGS. 12 and 13 depict the organizer 10 in the expanded (erected) and collapsed positions, respectively. The pair of handles 26A, 26B are laying flat in FIG. 12, and are pivoted up to an upright position (for carrying) in FIG. 13. The sidewalls 16A, 16B, 16C, 16D are vertical in FIG. 12 (the expanded position), and laying flat in FIG. 12 (the collapsed position). Also, in FIG. 13, the stabilizing leg 28A has been pivoted so that it is no longer extending down, but rather is generally parallel with the bottom of the base 12.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A collapsible container, comprising:
   a generally flat base element defined by an upper surface and and outer dam ridge extending from said upper surface;
   further comprising a stabilizing element pivotally attached to extend from said base element
   two or more side panel elements hingeably attached to said base element at a proximal end, each said side panel further defined by a distal end;
   an upper rim element defining an outer ring encircling a central aperture, said upper rim element comprising:
   a slot formed therethrough for accepting said distal end of each said side panel; and
   wherein said central aperture is dimensioned to cooperatively accept said base element therethrough; and
   one or more handles pivotally attached to said upper rim element.

2. The container of claim 1, further comprising a cup holder element attached to said upper rim element in said central aperture, said cup holder element comprising one or more cup apertures formed therethrough.

3. The container of claim 2, wherein said cup holder element further comprises one or more straw apertures formed therethrough.

4. The container of claim 3, wherein said cup apertures in said cup holder element are juxtaposed over said outer dam ridge.

5. The container of claim 4, further comprising cup rests and straw rest cups both comprising upwardly-extending ridges located within said outer dam ridge.

6. The container of claim 5, configured to define a first collapsed position wherein said side panels are pivoted relative to said base element until they are parallel thereto while said upper rim element is simultaneously slid down said side panels until it surrounds said base element.

7. The container of claim 6, configured to define a second expanded position wherein said side panels are pivoted relative to said base element until they are perpendicular thereto while said upper rim element is simultaneously slid up said side panels until said distal ends of said side panels are captured within said slots in said upper rim element.

8. The container of claim 7, further comprising a belt retainer clip extending from said base element, said belt retainer clip configured to accept an elongate strap therethrough.

9. A container configured to rest atop the seat of a vehicle, the container comprising:
   a base element;
   four side panels extending from proximal ends pivotally attached to said base element;
   an upper rim element slidingly attached to said four side panels;
   wherein said container is configured to define:
   a first collapsed position wherein said side panels are pivoted relative to said base element until they are parallel thereto while said upper rim element is simultaneously slid down said side panels until it surrounds said base element; and a second expanded position wherein said side panels are pivoted relative to said base element until they are perpendicular thereto while said upper rim element is simultaneously slid up said side panels until said distal ends of said side panels are captured within said upper rim element; and further comprising a belt retainer clip extending from said base element, said belt retainer clip configured to accept an elongate strap therethrough.

10. The container of claim 9, further comprising a cup holder element attached to said upper rim element in said central aperture, said cup holder element comprising one or more cup apertures formed therethrough.

11. The container of claim 10, wherein said base element is generally flat, and is defined by an outer dam ridge extending upwardly from said upper surface; said base element further defined by a lower surface having a roughened texture extending therefrom.

12. The container of claim 11, further comprising a cup holder element attached to said upper rim element in said central aperture, said cup holder element comprising one or more cup apertures formed therethrough.

13. The container of claim 12, wherein said cup apertures in said cup holder element are juxtaposed over said outer dam ridge.

14. The container of claim 13, further comprising a stabilizing element pivotally attached to extend from said base element.

* * * * *